3,077,818
BREAKAWAY SUSPENSION BAND
Carl E. Rhodes, Jr., China Lake, Calif., assignor to the United States of America as represented by the Secretary of the Navy
Filed Nov. 15, 1960, Ser. No. 69,527
3 Claims. (Cl. 89—1.5)
(Granted under Title 35, U.S. Code (1952), sec. 266)

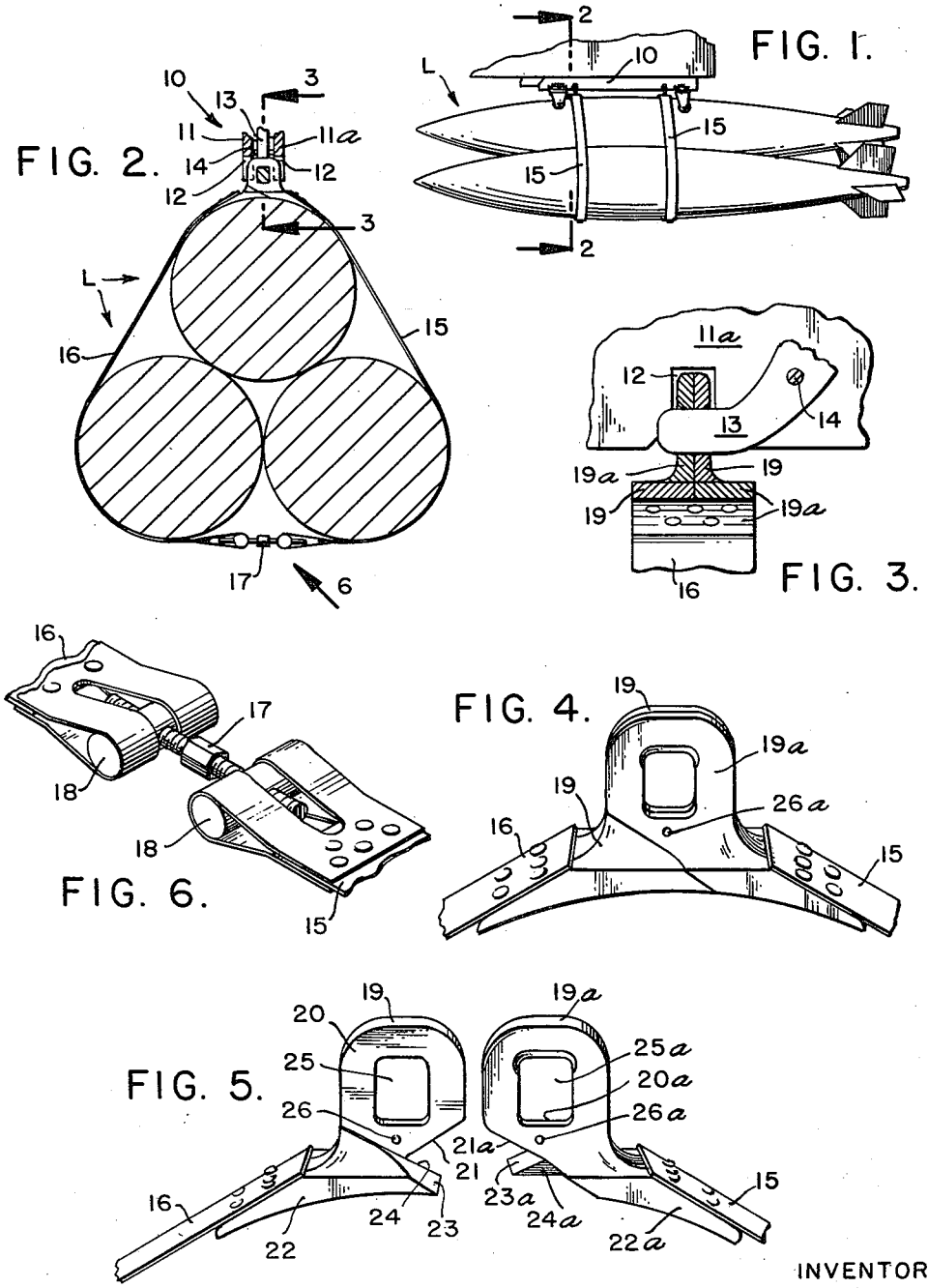

The invention described herein may be manufactured and used by or for the United States of America for governmental purposes without the payment of any royalties thereon or therefor.

This invention relates to launching apparatus for aircraft carried missiles and more particularly to breakaway suspension bands adapted to support one or more missiles from a conventional aircraft bomb rack and separate from the missile after the latter has been released from the bomb rack. Apparatus of this general type is well known in the art as exemplified by such patents as 2,786,392 to Niedling, 2,826,119 to Barrowman and 2,392,400 to Neff.

Of the prior art referred to, the patent to Niedling represents the closest approach to the construction employed in this invention, the pertinent feature of such patent being a pair of breakaway band suspension lugs which engage the bomb rack suspension hook and which are provided with mating camming surfaces which prevent circumferential relative movement of the lugs so long as they are restrained against relative lateral movement away from each other by the confronting faces of a downwardly open slot in the bomb rack which receive same. The load carried by the breakaway band is thus divided between the lugs and transferred to the hook without applying relative circumferential shear forces to the hook. When the hook is moved out of engagement with the lugs they fall out of the slot, relieving the lateral restraining forces, the cam surfaces being so shaped to then permit relative lateral movement until the cam surfaces disengage after which the lugs may separate in a circumferential direction due to the tension in the band.

One of the objects of this invention is to provide a tensioned band and mating lugs which are separably locked together against lateral and radial movements, independent of abutments, such as the slot referred to, but free to separate in a circumferential direction when a hook or the like is removed from the lug apertures.

Another object is to eliminate the close tolerance of parts necessary in the prior art by the provision of a two-part suspension lug which operates with equal effect irrespective of slot width which may result through manufacturing tolerances or wear.

Still further objects, advantages and salient features will become more apparent from the description to follow, the appended claims and the accompanying drawing, in which:

FIG. 1 is a side elevation of the lower portion of an aircraft and its bomb rack;

FIG. 2 is a section taken on line 2—2, FIG. 1;

FIG. 3 is an enlarged section taken on line 3—3, FIG. 2;

FIG. 4 is a perspective of parts of FIG. 3, removed from a bomb rack in mating relationship;

FIG. 5 is a perspective like FIG. 3 with the parts separated, and

FIG. 6 is a detail of the portion indicated by arrow 6, FIG. 2.

Referring in detail to the drawing, conventional bomb rack 10, previously referred to, comprises a pair of spaced parallel rails 11, 11a having a downwardly open slot 12 and a hook 13 pivoted between the rails on pivot pin 14. Similar slots and a similar hook are provided at second longitudinally spaced point on the rack.

The breakaway band comprises two band-like members 15, 16 which encircle a load L, such as a cluster of bombs, and which are tensioned by a right and left hand threaded turnbuckle 17, the ends of which threadedly engage barrel nuts 18, pivotally secured to ends of each band.

Suspension lugs 19, 19a are secured to the upper free ends of members 15, 16, respectively, such as by rivets, and are provided with aligned apertures 25, 25a, respectively, through which hook 13 extends, all as similarly disclosed in the Niedling patent, except for the turnbuckle feature. The lugs are identical, each having an abutment surface 20 or 20a on the upwardly projecting securing portion of the lug, and an abutment surface 21 or 21a partially on the securing portion and partially on its base portion 22 or 22a. The base portion of each lug is provided with an abutment surface 23 or 23a and abutment surfaces 24 or 24a. When the two lugs are moved together, as shown in FIG. 4, surfaces 20, 20a are in engagement, surfaces 24 and 24a are in engagement, surfaces 23 and 21a are in engagement and surfaces 21 and 23a are in engagement. The lugs are thus locked against movement in all directions except in the circumferential direction of tension in the band which is restrained by the hook which extends through the apertures of both lugs. When the hook is released from the lug apertures the lugs separate in a circumferential direction, due to the tensioning in the band, and the band falls free of the load L as is conventional in the art.

Aligned apertures 26, 26a may optionally be provided for temporarily securing the lugs together with a small wire.

Obviously many modifications and variations of the present invention are possible in the light of the above teachings. It is therefore to be understood that within the scope of the appended claims the invention may be practiced otherwise than as specifically described.

What is claimed is:
1. A pair of identical lugs adapted to be secured to adjacent ends of a tensioned band or the like, each lug having an aperture extending therethrough disposed symmetrically to each side of a reference plane and having a flat first abutment surface disposed in the plane of the band, a second abutment surface on said lug disposed at one side of and perpendicular to said first surface, a third abutment surface disposed at the other side of and perpendicular to said first surface, said second and third surfaces intersecting each other at said reference plane, and a fourth surface on said lug disposed in said first named plane joining said second and third surfaces, said lugs being disposed in mating relationship with the first abutment of one engaging the first abutment of the other, the fourth abutment of one engaging the fourth abutment of the other, and the second abutment of one engaging the third abutment of the other, whereby the abutting surfaces prevent relative rectilinear movement between the lugs in all directions except in the direction of tension in the band, and a member adapted to be inserted through the apertures of the lugs for preventing the last named movement.

2. A pair of identical lugs adapted to be secured to adjacent ends of a tensioned band or the like, each lug comprising a base portion and a securing portion projecting laterally outward thereof in the plane of the band, said securing portion having an aperture extending therethrough disposed symmetrically to each side of a reference plane, the securing portion having a flat first abutment surface disposed in the plane of the band, a second flat abutment surface on said base portion disposed at one side of and perpendicular to said first surface, a third flat abutment surface disposed at the other side of and perpendicular to said first surface and being partially on said securing portion and partially on said base portion, the planes of said second and third surfaces intersecting each other at said reference plane, and a fourth surface on said base portion disposed in said first named plane joining said second and third surfaces, said lugs being disposed in mating relationship with the first abutment of one engaging the first abutment of the other, the fourth abutment of one engaging the fourth abutment of the other, and the second abutment of one engaging the third abutment of the other, whereby the abutting surfaces prevent relative rectilinear movement between the lugs in all directions except in the direction of tension in the band, and a member adapted to extend through the apertures of the lugs for preventing the last named movement.

3. Apparatus in accordance with claim 2 wherein said lugs are disposed within a downwardly open slot in a bomb rack, and said member comprises a bomb rack hook or the like.

References Cited in the file of this patent

UNITED STATES PATENTS

| | | |
|---|---|---|
| 2,690,122 | Darnall et al. | Sept. 28, 1954 |
| 2,786,392 | Niedling | Mar. 26, 1957 |
| 2,936,186 | Dunmire | May 10, 1960 |